United States Patent [19]

Cuomo et al.

[11] Patent Number: 5,291,555

[45] Date of Patent: Mar. 1, 1994

[54] COMMUNICATION USING SYNCHRONIZED CHAOTIC SYSTEMS

[75] Inventors: Kevin M. Cuomo, Chelmsford; Alan V. Oppenheim, Lexington, both of Mass.

[73] Assignee: Massachusetts Institute of Technology, Cambridge, Mass.

[21] Appl. No.: 989,703

[22] Filed: Dec. 14, 1992

[51] Int. Cl.⁵ .......................... H04K 1/02; H04L 9/28
[52] U.S. Cl. ................................ 380/6; 380/9; 380/34; 380/46; 380/48; 380/28; 375/1; 364/717; 331/78
[58] Field of Search ................. 380/6, 9, 28, 29, 30, 380/43, 46, 49, 50, 59, 48, 34; 375/1; 364/717; 331/78

[56] References Cited

U.S. PATENT DOCUMENTS 3,059,054 10/1962 Reiter ............................ 380/6
4,179,658 12/1979 Bitzer ............................ 380/6
5,007,087 4/1991 Bernstein et al. .................. 380/46
5,048,086 9/1991 Blanco et al. ..................... 380/28

OTHER PUBLICATIONS

Carroll, Thomas L., et al., "Synchronizing Chaotic Circuits", IEEE Transactions on Circuits and Systems, vol. 38, No. 4, pp. 453 to 456, Apr. 1991.

Pecora, Louis M., et al., "Synchronization in Chaotic Systems", Physical Review Letters, vol. 64, No. 8, pp. 821 and 824, Feb. 19, 1990.

Cuomo, Kevin M., et al., "Spread Spectrum Modulation and Signal Masking Using Synchronized Chaotic Systems", RLE Technical Report No. 570, Research Laboratory of Electronics, MIT, Mass., pp. i to iii and 1 to 37.

*Primary Examiner*—Bernarr E. Gregory
*Attorney, Agent, or Firm*—Stuart P. Meyer; Edward J. Radlo

[57] ABSTRACT

A chaotic transmitter (100) operates according to preselected chaotic protocols, such as a set of Lorenz equations. Modulation is accomplished by modifying a predetermined parameter of the set of chaotic Lorenz equations with a message signal, thereby producing a spread spectrum chaotic transmitted signal. A corresponding receiver (200) reconstructs a synchronizing drive signal, which is used by a demodulator (412) of the receiver (200) to detect the message signal.

9 Claims, 6 Drawing Sheets

COMMUNICATION USING SYNCHRONIZED CHAOTIC SYSTEMS

SUBJECT INVENTION

The present invention is a subject invention under contracts AFOSR-91-0034-A and N00014-91-C-0125 with the United States Government, and as such the United States Government has rights therein.

FIELD OF THE INVENTION

The present invention relates generally to communication systems and specifically to systems and methods of communicating signals using synchronized chaotic circuits.

DESCRIPTION OF BACKGROUND ART

Numerous schemes have been proposed to make radio communications relatively immune to interference and secure from undesired listeners. A simplistic technique for securing such communications is through use of a standard audio encryption system on a conventionally transmitted signal, and use of a corresponding decryption system once the signal is received. A more sophisticated technique, known as spread-spectrum transmission, relies on transmission of an information signal over a wide range of frequencies, using temporal frequency-hopping, broad-band modulation, or other well-known mechanisms.

One encryption scheme, taught in U.S. Pat. No. 5,048,086 to Bianco et al, employs the mathematical theory of chaos by encrypting data with a chaotic equation known as the logistic difference equation.

Other chaotic systems are discussed in L. M. Pecora and T. L. Carroll, *Synchronization in Chaotic Systems*, 64:8 PHYSICAL REVIEW LETTERS, p. 821 (Feb. 19, 1990) and in T. L. Carroll and L. M. Pecora, *Synchronizing Chaotic Circuits*, 38:4 IEEE TRANSACTIONS ON CIRCUITS AND SYSTEMS, p. 453 (Apr. 1991). These articles disclose a theory of synchronizing two chaotic systems, describe a circuit demonstrating such synchronization, and suggest as an application the linking of two remote systems, each with internal signals behaving chaotically, yet in synchronization with each other.

None of the known teachings, however, provides a practical application for synchronized chaotic systems. Ideally, chaotic techniques could be applied to communications systems to provide relatively simple means for achieving robust and secure communications.

DISCLOSURE OF INVENTION

An advantageous technological application of the mathematical theory of chaos is achieved by a communications system (400) having a chaotic transmitter (100) at a first location, the chaotic transmitter (100) including a chaotic drive signal generator (404) producing a chaotic drive signal and a modulator (402) for modulating a parameter of the chaotic drive signal generator (404) by a message signal to produce a transmitted signal; and a receiver (200) for receiving the transmitted signal, the receiver (200) including a drive signal regenerator (414) for reconstructing the drive signal from the received signal, and a demodulator (412) for comparing the received signal with the reconstructed drive signal and detecting therefrom the message signal.

In an alternate embodiment, the drive signal is transmitted to a receiver (5200) over a separate communications channel rather than being reconstructed from the received message-bearing signal.

In another aspect of the invention, masking apparatus (6100) adds chaotic signals to message signals before sending the masked message signals; when the masked signals are received, a drive signal regenerator (614) reconstructs the chaotic signals from the masked signals and a subtractor (612) subtracts the chaotic signals from the masked signals to obtain the original message signals.

BEST MODE FOR CARRYING OUT THE INVENTION

Figure 1:
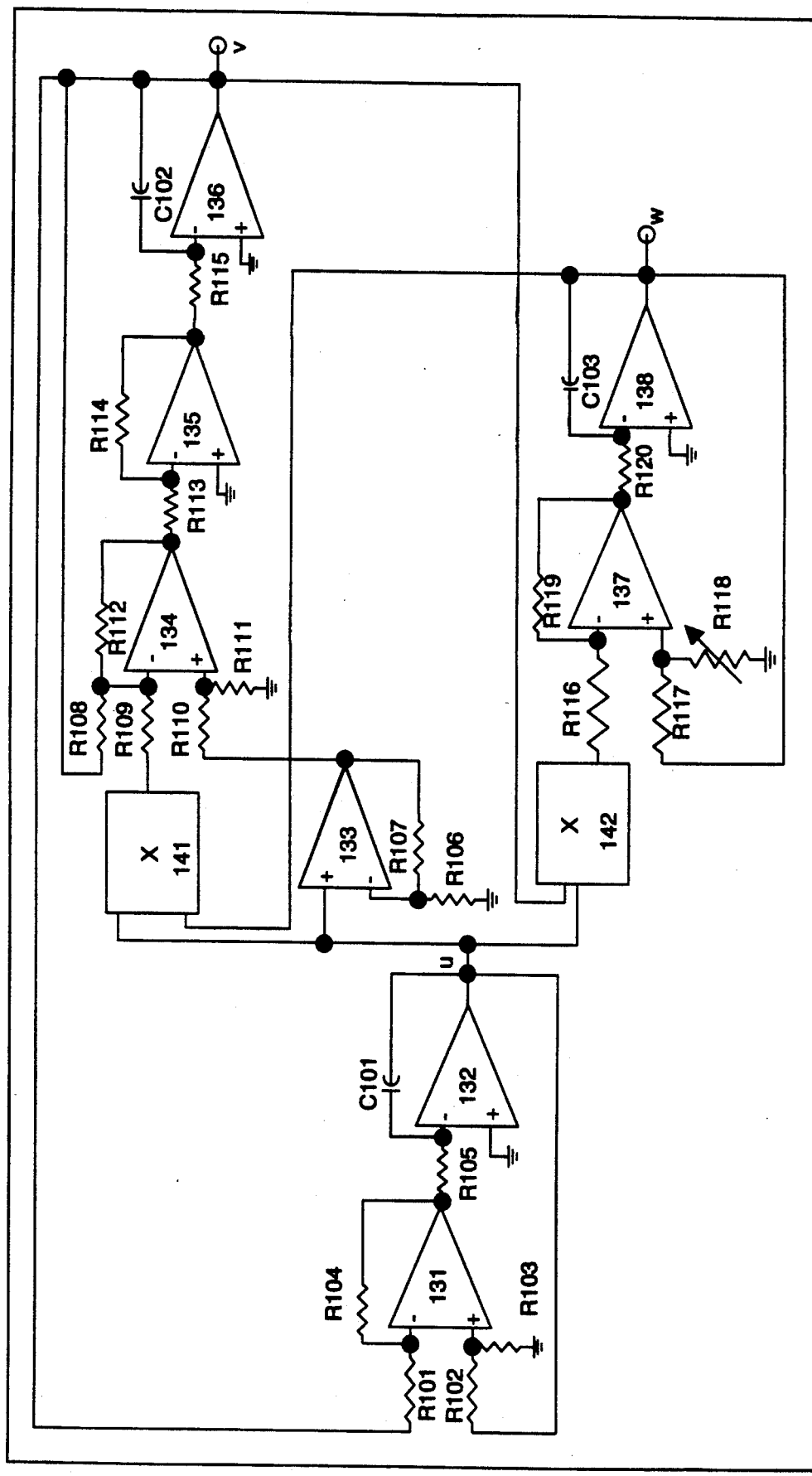
FIG. 1 is a circuit diagram of a chaotic drive signal generator (404) in accordance with the present invention.
Figure 4:
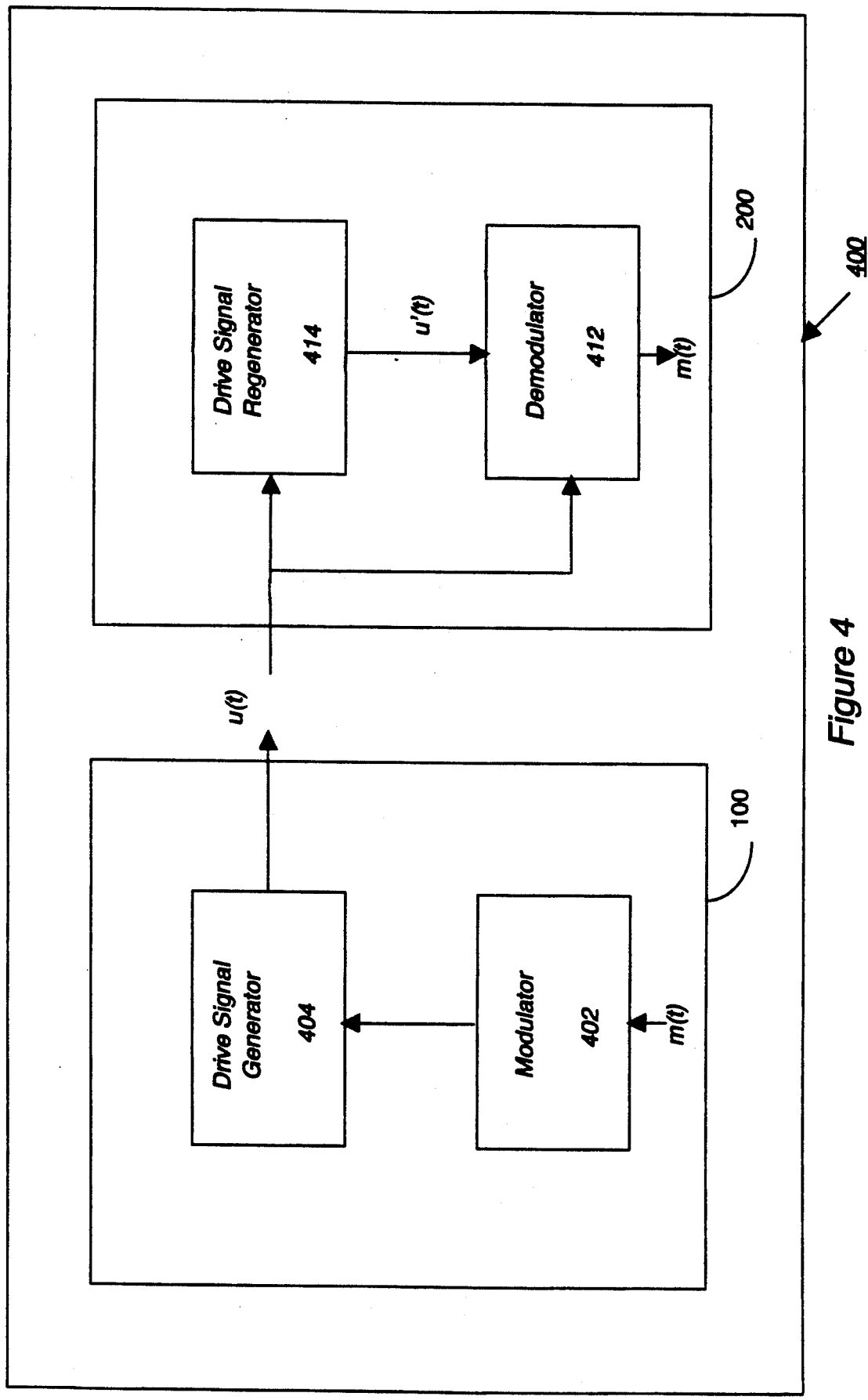
FIG. 4 is a block diagram of a chaotic transmitter (100) and a chaotic receiver (200) in accordance with the present invention.

Referring now to FIGS. 1 and 4, there is shown a chaotic transmitter 100 in accordance with the present invention. In a preferred embodiment, the transmitter 100 is configured to produce chaotic signals u, v, w according to the well-known "Lorenz" chaotic system which arises in the study of thermal convection, and which is represented by a set of Lorenz equations having the form:

$$u = \sigma(v-u)$$
$$v = ru - v - 20uw \quad \text{(Eq. 1)}$$
$$w = 5uv - bw$$

where $\sigma$, r and b are positive constant parameters. In a preferred embodiment, the values $\sigma=16$, $r=45.6$ and $b=4$ are used. A more complete discussion of the Lorenz system may be found in K. M. Cuomo et al, *Synchronized Chaotic Circuits and Systems for Communications*, RLE TECHNICAL REPORT NO. 575, Massachusetts Institute of Technology, a pre-publication version of which is included herein as an appendix, and K. M. Cuomo et al, *Spread Spectrum Modulation and Signal Masking Using Synchronized Chaotic Systems*, RLE TECHNICAL REPORT NO. 570, Massachusetts Institute of Technology (Feb. 1992), the teachings of which are incorporated herein by reference. While a Lorenz-based system has been used in a preferred embodiment, it may also be possible to implement a chaotic transmitter in accordance with the present invention using a Rössler-based system, a system based on the "double scroll" equations, a system based on a discrete-time Henon map or some other system known by those skilled in the art to exhibit chaotic behavior.

In a preferred embodiment, the output signal u(t) is used as the transmitted "drive" signal The signal u(t) exhibits characteristics of a spread spectrum transmitted signal, displaying considerable complexity and unpredictability. The signal u(t) has a nearly uniform power spectrum over the desired communication bandwidth, and thus sounds like low-amplitude noise when received by an non-synchronized receiver. A message signal m(t) modulates one of the parameters of the Equations 1 with the information to be transmitted. At the receiver 200, the drive signal is reconstructed as u'(t), with differences between the reconstructed drive signal and the received signal corresponding to the modulation by the message signal m(t). FIG. 4 illustrates such a system in block diagram form. A drive signal generator subsystem 404 is modulated by modulator 402 driven by the message signal m(t), thereby producing a transmitted signal u(t). The transmitted signal is received and applied to drive signal regenerator 414, which produces a reconstructed drive signal u'(t). Demodulator 412 then compares u'(t) with the received signal u(t) to detect the original message signal m(t).

Referring specifically now to FIG. 1, in a preferred embodiment drive signal generator 404 consists of operational amplifiers 131–138, multipliers 141–142, resistors R101–R120, and capacitors C101–C103. In said preferred embodiment, amplifiers 131–138 are conventional type LF353 operational amplifiers; multipliers 141–142 are conventional type AD632AD multipliers; resistors R101–R104, R106, R107, R113, R114, R116, R117 and R119 are 100 kohm, 1% precision resistors; R105 and R110 are 49.9 kohm, 1% precision resistors; R108 is a 200 kohm, 1% precision resistor; R109 and R112 are 10 kohm, 1% precision resistors; R111 is a 63.4 kohm, 1% precision resistor; R115 is a 40.2 kohm, 1% precision resistor; R118 is a variable resistor described in more detail below in connection with modulator 402; R120 is a 158 kohm, 1% precision resistor; and capacitors C101–C103 are 1000 picofarad, 5% precision capacitors. While those skilled in the art will readily understand the implementation illustrated in FIG. 1, further explanation is contained in the technical reports incorporated herein as an appendix and by reference above.

Figure 2:
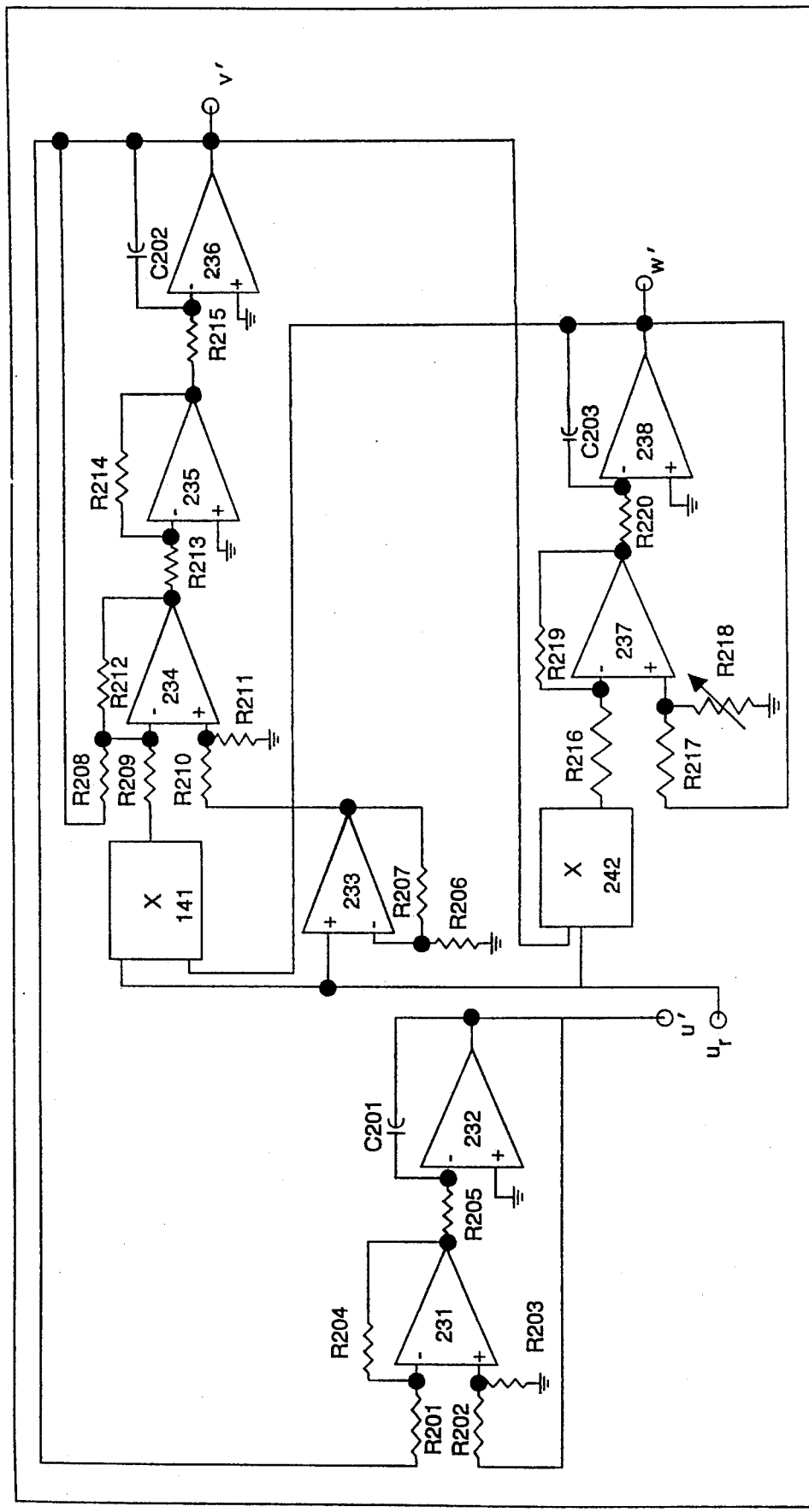
FIG. 2 is a circuit diagram of a chaotic drive signal regenerator (414) in accordance with the present invention.

Referring now to FIGS. 2 and 4, there is shown a receiver 200 in accordance with the present invention. Referring specifically now to drive signal regenerator 414, in a preferred embodiment, components 231–238, 241, 242, R201–R217, R219, R220, and C201–C203 are identical to components 131–138, 141, 142, R101–R117, R119, R120, and C101–C103, respectively, described above in connection with FIG. 1. R218 is a 66.5 kohm, 1% precision resistor. The received drive signal $u_r(t)$, which is a noise-corrupted version of the drive signal u(t), is applied to drive signal regenerator 414 as shown in FIG. 2. With no modulation to perturb the drive signal u(t), the reconstructed drive signal u'(t) is identical to the received drive signal $u_r(t)$. When the transmitted drive signal u(t) is perturbed by modulation of the information signal m(t), the reconstructed drive signal u'(t) is not immediately affected, as drive signal regenerator 414 acts as a flywheel or phase-locked loop to prevent modulation from altering the reconstructed drive signal u'(t). Thus, the difference between the reconstructed drive signal u'(t) and the received drive signal $u_r(t)$ may be detected, and the information signal m(t) retrieved, using conventional demodulator circuitry 412 which, in the preferred embodiment, uses subtractor circuitry, squaring circuitry, low-pass filter circuitry and threshold circuitry in a conventional manner to recover m(t). While those skilled in the art will readily understand the implementation illustrated in FIG. 2, further explanation is contained in the technical reports incorporated herein as an appendix and by reference above.

Figure 3:
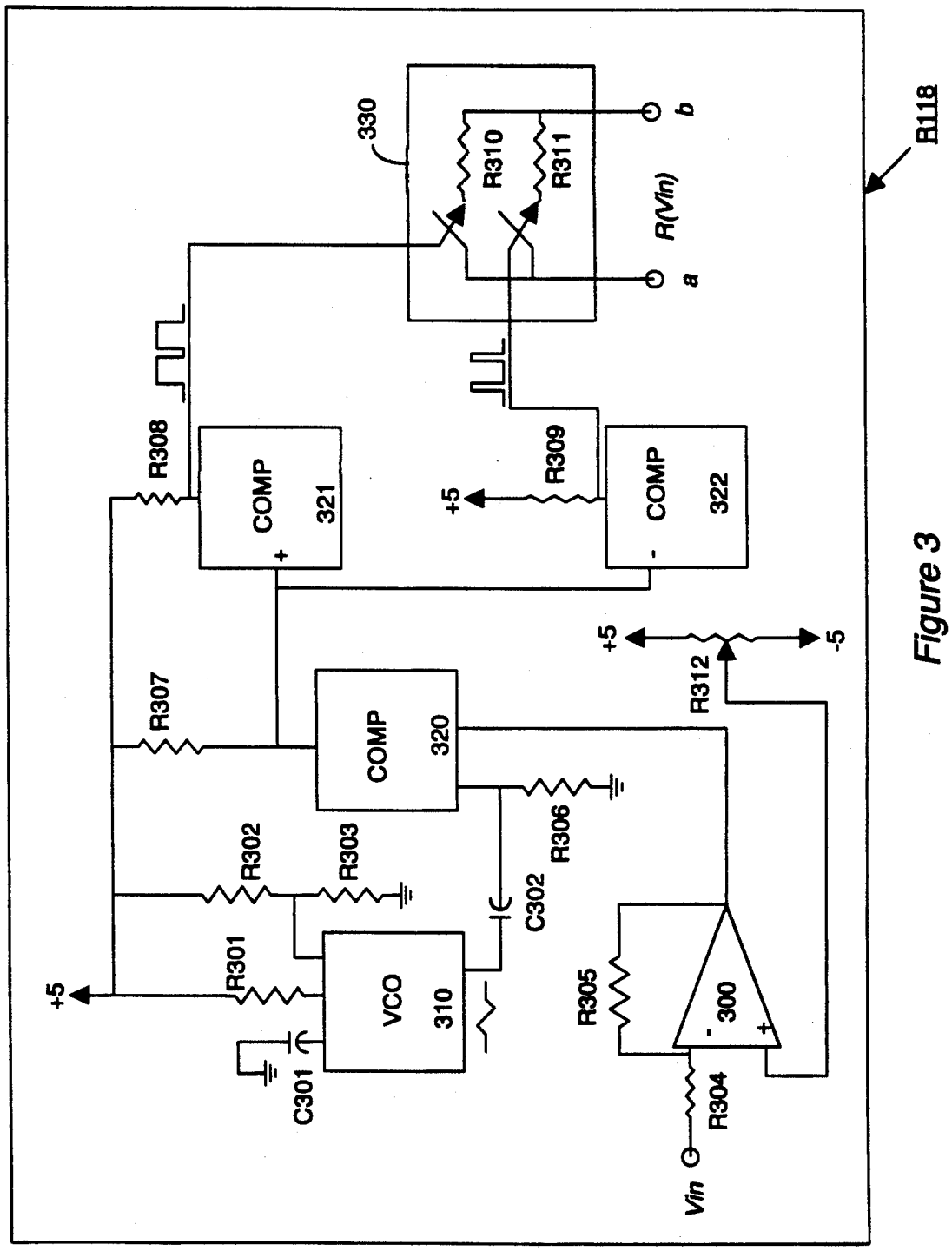
FIG. 3 is a circuit diagram of a voltage-controlled variable resistor (R118) in accordance with the present invention.

Referring now to FIG. 3, there is shown a circuit for implementing variable resistor R118 to serve as modulator 402. Referring also to FIG. 1, drive signal generator 404 is modulated by varying one of the parameters σ, r or b of the Lorenz equations of Equation 1. It has been found that variation in the parameter b produces good results. In the circuitry of FIG. 1, the ratio 10(R118/(R117+R118)) determines the value of the parameter b. Therefore, modulation using variation in the parameter b can be achieved by varying the value of R118 with the modulating signal m(t). FIG. 3 illustrates a preferred embodiment of a circuit for a voltage controlled variable resistor R118. An applied modulating signal Vin (in operation, the message signal m(t)) is buffered and level-shifted by amplifier 300 and associated resistors R304, R305, and threshold-setting variable resistor R312. The output of amplifier 300 is applied to a comparator 320. The output of a voltage controlled oscillator subcircuit formed by voltage controlled oscillator 310, resistors R301-R303, R306, and capacitors C301-C302 is also applied as an input to comparator 320. The frequency of the signal produced by voltage controlled oscillator 310 is substantially greater than that of the modulating signal Vin, and comparator 320 and associated output resistor R307 produce an output with a frequency substantially equal to that of voltage controlled oscillator 310 and a duty cycle that varies with changes in Vin. The pair of comparators 321, 322 with their associated output resistors R308, R309 produce buffered and inverted versions, respectively, of the signal produced by comparator 320. The outputs from comparators 321, 322 are applied to a dual voltage controlled switch 330, in which resistors R310 and R311 are alternately connected to terminals a and b to provide a variable resistance R(Vin) that changes in response to changes in Vin.

Figure 5:
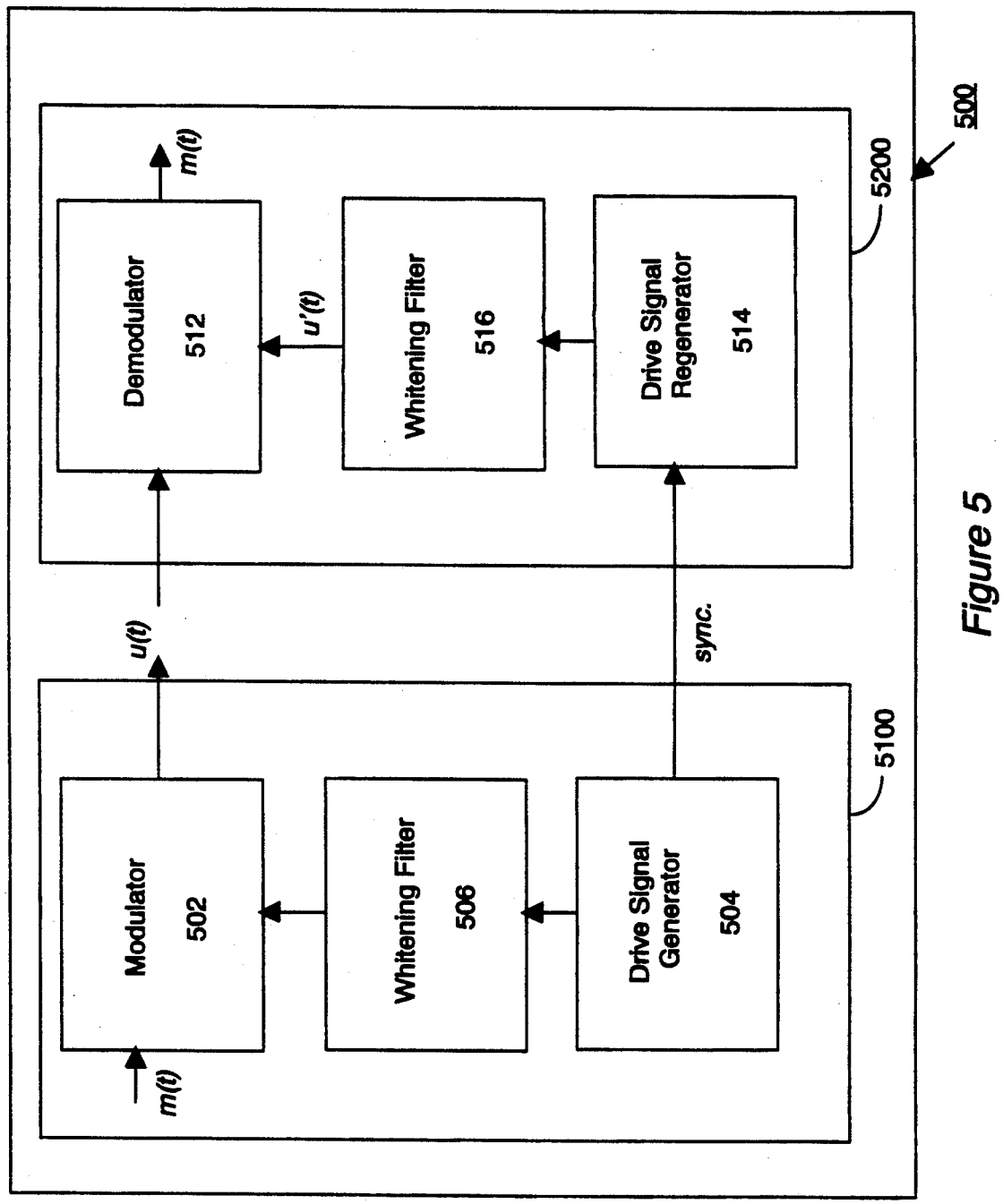
FIG. 5 is a block diagram of an alternative chaotic transmitter (5100) and an alternative chaotic receiver (5200) in accordance with the present invention.

Referring now to FIG. 5, there is shown an alternative communication system 500 in accordance with the present invention. In this system 500, transmitter 5100 comprises a drive signal generator 504 for producing a chaotic signal and a synchronizing signal. The synchronizing signal may be either the chaotic signal itself, or any signal that allows re-creation of the chaotic signal at the receiver 5200. The synchronizing signal is applied to a drive signal regenerator 514 of the receiver 5200, either over a dedicated radio channel, a direct wire line, or another communications channel. The chaotic signal produced by drive signal generator 504 is equalized by optional whitening filter 506 to remove any peaks or nulls in the frequency power distribution function of the chaotic signal, and then applied to modulator 502 for modulation by message signal m(t) and transmission of the resulting chaotic signal u(t) to receiver 5200. Whitening filter 506 may not be required if the power distribution function of the chaotic signal produced by generator 504 is sufficiently uniform. In accordance with the present invention, message signal m(t) may be combined with a chaotic signal by direct multiplication modulation or conventional quadrature modulation. At receiver 5200, the synchronizing signal is applied to a drive signal regenerator 514 to reconstruct a chaotic signal identical to that produced by drive signal generator 504 of transmitter 5100. An identical whitening filter 516 to filter 506 is applied to the reconstructed chaotic signal to produce u'(t), which is compared with the received signal u(t) by demodulator 512 to retrieve the original message signal m(t). Where additional communication channels are available over which the synchronizing signal can be sent, this system 500 provides the advantages of the system illustrated in FIGS. 1-4 without requiring the flywheel or "phase-lock" functionality described above to permit reconstruction of the unmodulated chaotic signal from the received signal u(t).

It will be recognized by those skilled in the art that the features of the present invention may also be used to effectively mask information-bearing signals before they are conventionally transmitted or otherwise sent from one location to another. For instance, sensitive digital information may be masked by applying such information to a circuit of the form of transmitter 100, then sent over a wired line to a second location where a circuit of the form of receiver 200 can detect the digital information. Any person placing a wire tap on the line across which the information is being transmitted, however, will detect only what appears to be white noise.

Figure 6:
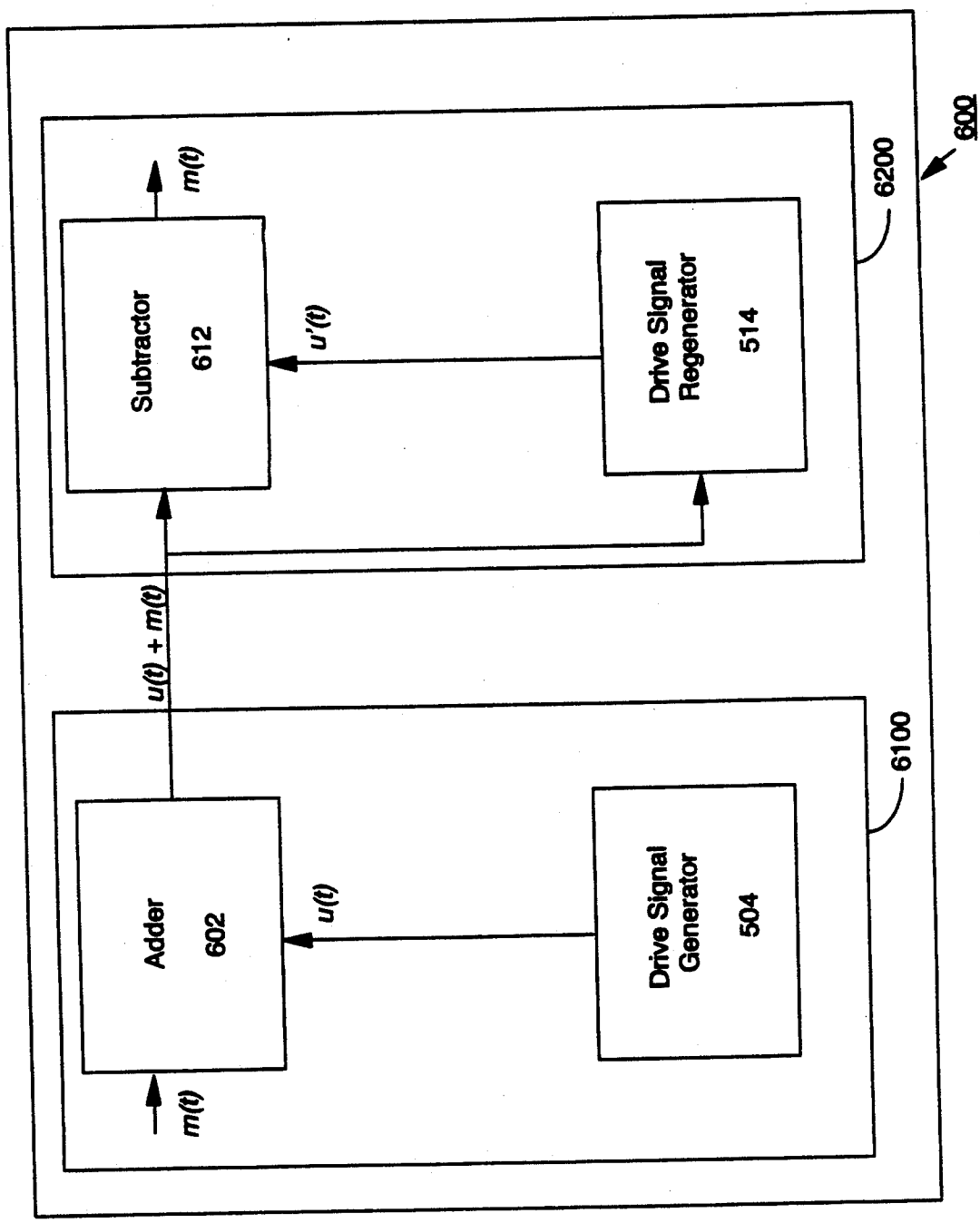
FIG. 6 is a block diagram of apparatus (600) for generating (6100) and receiving (6200) masked message signals in accordance with the present invention.

An even simpler system for signal masking is illustrated in FIG. 6. In the system 600, a signal masking transmitter 6100 includes a drive signal generator 604 to produce a chaotic signal u(t). A conventional adder 602 simply adds the message signal m(t) and the chaotic signal u(t) to result in a masked signal u(t)+m(t). The chaotic signal is added in a large enough proportion to decrease the signal to noise ratio of the message signal to a point where the message signal is unrecognizable in the masked signal. At the receiver 6200, the drive signal regenerator 614 reconstructs the chaotic signal as u'(t), and subtractor 612 then recreates the message signal m(t) by subtracting the reconstructed chaotic signal u'(t) from the masked signal u(t)+m(t).

The above description is included to illustrate the operation of preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A system for communicating a message signal from a first location to a second location, said first and second locations being linked by a noisy channel, comprising:
   a transmitter at said first location, the transmitter including a chaotic drive subsystem producing a deterministic chaotic signal and a modulator for perturbing said deterministic chaotic signal by said message signal to produce a transmitted signal for application to said noisy channel; and
   a receiver at said second location, the receiver including a chaotic signal regenerator receiving from said noisy channel a noisy signal corresponding to a noise-corrupted version of said transmitted signal and producing therefrom a reconstructed chaotic signal, and a demodulator for comparing said noisy signal with said reconstructed chaotic signal and detecting from said comparison said message signal.

2. A system for communicating a message signal from a first location to a second location, said first and second locations being linked by a noisy channel, comprising:
   a transmitter at said first location, the transmitter including a chaotic drive subsystem producing a deterministic chaotic drive signal and a modulator for modulating said message signal by said deterministic chaotic drive signal to produce a transmitted signal for application to said noisy channel; and
   a receiver at said second location, the receiver including a chaotic signal regenerator coupled to said chaotic drive system, receiving therefrom said deterministic chaotic drive signal and producing a reconstructed chaotic signal, and a demodulator coupled to said chaotic signal regenerator, receiving from said noisy channel a noisy signal corresponding to a noise-corrupted version of said transmitted signal, and producing therefrom and from said reconstructed chaotic signal said message signal.

3. A system for communicating a message signal from a first location to a second location, said first and second locations being linked by a noisy channel, comprising:
   a transmitter at said first location, the transmitter including a chaotic drive subsystem producing a deterministic chaotic drive signal, a whitening filter coupled to said chaotic drive subsystem for producing a whitened chaotic signal from said deterministic chaotic drive signal, and a modulator for modulating said message signal by said whitened chaotic signal to produce a transmitted signal for application to said noisy channel; and
   a receiver at said second location, the receiver including a chaotic signal regenerator coupled to said chaotic drive system, receiving therefrom said deterministic chaotic drive signal and producing a reconstructed chaotic signal, a response whitening filter coupled to said chaotic drive signal regenerator, receiving therefrom said reconstructed chaotic signal and producing a whitened reconstructed chaotic signal, and a demodulator coupled to said response whitening filter, receiving from said noisy channel a noisy signal corresponding to a noise-corrupted version of said transmitted signal, and producing therefrom and from said whitened reconstructed chaotic signal said message signal.

4. A system for communicating a message signal from a first location to a second location, said first and second locations being located being linked by a noisy channel, comprising:
   a transmitter at said first location, the transmitter including a chaotic drive subsystem producing a deterministic chaotic signal and a modulator for modulating a parameter of said deterministic chaotic signal by said message signal to produce a transmitted signal for application to said noisy channel; and
   a receiver at said second location, the receiver including a drive signal regenerator receiving from said noisy channel a noisy signal corresponding to a noise-corrupted version of said transmitted signal and producing therefrom a reconstructed chaotic signal, and a demodulator for comparing said noisy signal with said reconstructed chaotic signal and detecting from said comparison said message signal.

5. A system for communicating a message signal from a first location to a second location, said first and second locations being linked by a noisy channel, comprising:
   a transmitter at said first location, the transmitter including a chaotic drive subsystem producing a deterministic chaotic signal and a modulator for modulating a parameter of said deterministic chaotic signal by said message signal to produce a transmitted signal for application to said noisy channel, the deterministic chaotic signal produced by said chaotic drive subsystem being defined by the differential equation:

$$u = \sigma(v-u)$$

$$v = ru - v - 20uw$$

$$w = 5uv - bw$$

where u is said deterministic chaotic signal, v and w are additional deterministic chaotic signals, $\sigma$, r and b are preselected coefficients, and wherein said parameter is preselected coefficient b; and a receiver at said second location, the receiver including a drive signal regenerator receiving from said noisy channel a noisy signal corresponding to a noise-corrupted version of said transmitted signal and producing therefrom a reconstructed chaotic signal, and a demodulator for comparing said noisy signal with said reconstructed chaotic signal and detecting from said comparison said message signal.

6. A method of masking a message signal to be sent from a first location to a second location, the method comprising the steps of:

generating a deterministic chaotic signal at said first location;

perturbing said deterministic chaotic signal with said message signal;

sending said perturbed deterministic chaotic signal to said second location;

reconstructing said deterministic chaotic signal at said second location; and detecting said message signal at said second location by comparing said perturbed deterministic chaotic signal with said reconstructed deterministic chaotic signal.

7. A method of masking a message signal to be sent from a first location to a second location, the method comprising the steps of:

generating a deterministic chaotic signal at said first location;

perturbing said deterministic chaotic signal with said message signal;

sending said perturbed deterministic chaotic signal and said deterministic chaotic signal to said second location; and detecting said message signal at said second location by comparing said perturbed deterministic chaotic signal with said deterministic chaotic signal.

8. A method of masking a message signal to be sent from a first location to a second location, the method comprising the steps of:

generating a deterministic chaotic signal at said first location;

adding said deterministic chaotic signal to said message signal to form a masked signal;

sending said masked signal to said second location;

reconstructing said deterministic chaotic signal at said second location from said masked signal; and detecting said message signal at said second location by comparing said masked signal with said reconstructed deterministic chaotic signal.

9. A system for masking and detecting a message signal, the system comprising:

a signal masking transmitter, including a deterministic chaotic signal generator for producing a deterministic chaotic signal, and an adder coupled to said chaotic signal generator and to which said message signal is applied, for adding said deterministic chaotic signal to said message signal to produce a masked signal; and a signal detector, including a chaotic signal regenerator to which said masked signal is applied for producing a reconstructed chaotic signal from said masked signal, and a subtractor to which said masked signal is applied, coupled to said chaotic signal regenerator, for detecting said message signal by subtracting said reconstructed chaotic signal from said masked signal.

* * * * *